Jan. 27, 1942.　　　S. J. A. M. BAGNO　　　2,270,991
METER
Filed June 22, 1938　　　3 Sheets-Sheet 1

INVENTOR
SAMUEL J. A. M. BAGNO
BY
ATTORNEY

Jan. 27, 1942.          S. J. A. M. BAGNO          2,270,991
                              METER
                        Filed June 22, 1938          3 Sheets-Sheet 2
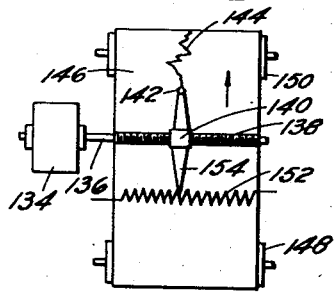
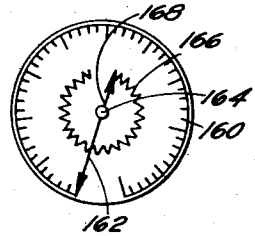
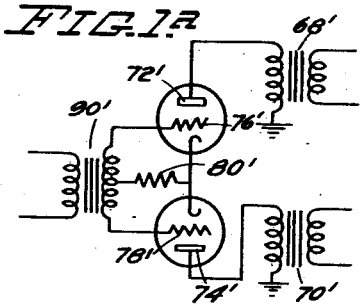
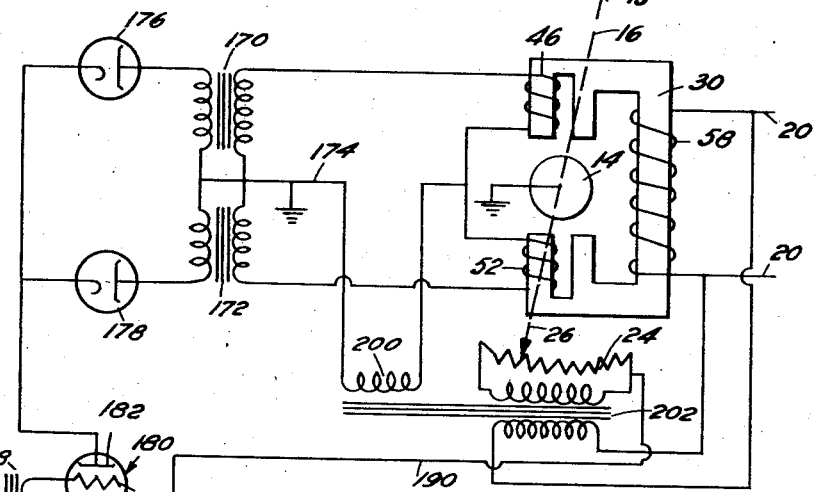
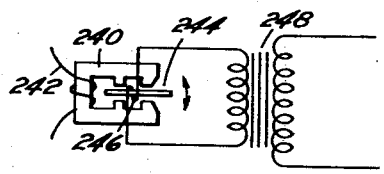
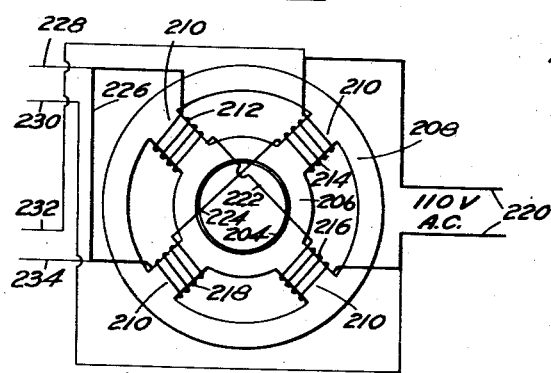
INVENTOR
SAMUEL J. A. M. BAGNO
BY
ATTORNEY

INVENTOR
SAMUEL J. A. M. BAGNO
BY
ATTORNEY

Patented Jan. 27, 1942

2,270,991

UNITED STATES PATENT OFFICE 2,270,991

METER

Samuel J. A. M. Bagno, New York, N. Y., assignor to Kurman Electric Co., New York, N. Y., a corporation of New York Application June 22, 1938, Serial No. 215,303

25 Claims. (Cl. 171—95)

This invention relates to meters, and more particularly to measuring devices of the motor-driven or "follow-up" type.

The primary object of my invention is to generally improve measuring devices, and more especially follow-up motors. A more particular object resides in the provision of a motor unit for a meter or measuring device, which motor unit will operate at high speed, and develop a large torque, so that it may be used for dependable actuation of a recording stylus.

Still another object of my invention is to provide a measuring instrument the motor unit of which is adapted for rotation over unlimited arc in one direction or the other. This makes it possible to operate an indicating pointer or the like over 360° of arc, so that the instrument may be made compact, its face or dial being kept down to a small diameter while using large, easily read scale divisions. Moreover, the motor may be run continuously in either direction for many revolutions, thus making possible the use of reduction gearing to obtain a high output torque. Alternatively, the motor may be used to drive a lead screw in one direction or the other, thereby moving a recording pen or the like in a rectilinear path. In a broad sense, this is merely another form of motion reducing or reduction gear mechanism.

Further objects are to provide a motor of the character heretofore described which will be sensitive; which will operate at high speed, the response being substantially instantaneous; which will in addition be accurate in response; and which will operate independently of fluctuations in the line voltage over wide limits. A further object of my invention is to so design the aforesaid motor that, unlike double contact three-wire reversing motor systems, it will operate without hunting. Instead, the motor moves rapidly and comes directly to rest at exactly the proper point. It moves at full speed until it nearly reaches the point of rest, and thereupon the change is incremental and approaches a definite limit, the motor torque falling off rapidly and reaching zero at the point of rest. Still another object centers about the provision of a measuring instrumentality which may be operated with alternating current, and more particularly, from ordinary commercial light and power circuits such as the conventional 110-volt 60-cycle alternating current lines. In this connection, a more particular object of my invention is to provide associated control circuits for the motor which even when including vacuum tubes for amplification or control purposes, nevertheless, do not require a direct current source or special rectifier-and-filter power supply circuits acting as a direct current source.

To the accomplishment of the foregoing and other more particularized objects which will hereinafter appear, my invention consists in the meter and follow-up motor elements with associated circuits, and their relation one to the other, as hereinafter are more particularly described in the specification and sought to be defined in the claims. The specification is accompanied by drawings, in which:

Fig. 1a is a modification;

Fig. 6 is a schematic representation showing the application of the invention to a recorder of the drum type;

Fig. 7 is a schematic representation showing the application of the invention to an indicating meter having a scale extending over an arc of nearly 360°;

Fig. 8 is a wiring diagram for a modified circuit arrangement applied to the induction motor of Figs. 3 and 4;

Fig. 9 is a wiring diagram explanatory of the application of the invention to a different form of induction motor;

Figure 11:
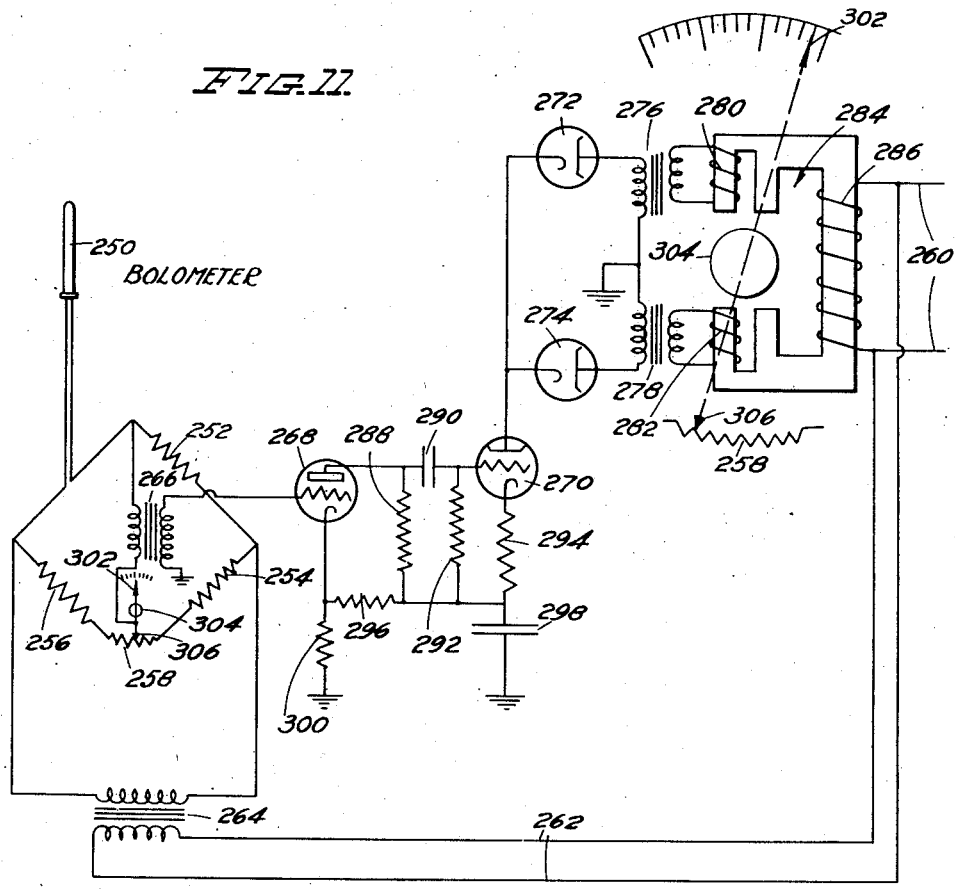

Fiv. 10 illustrates the application or use of the invention for recording of micrometric movement;

Fig. 11 illustrates the invention applied to temperature recording; and

Figure 12:
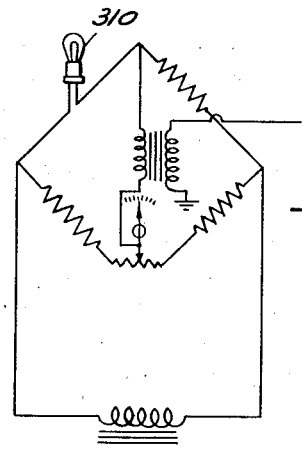

Fig. 12 illustrates the invention applied to voltage recording.

Figure 1:
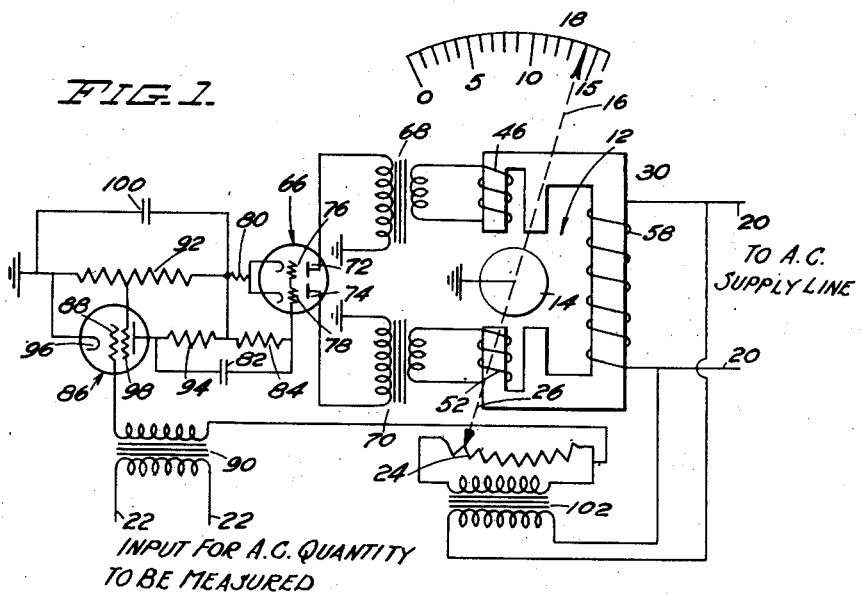
Fig. 1 is a wiring diagram explanatory of one preferred form of the invention.

Referring to the drawings, and more particularly to Fig. 1, the invention comprises an induction motor generally designated 12, the rotor 14 of which carries either directly, or through appropriate reduction gearing, a suitable pointer 16 cooperating with a scale 18. Alternating current for energizing the field of the motor is supplied through leads 20 which may be connected to an ordinary commercial lighting circuit such as a conventional 110-volt 60-cycle line. The motor is a single phase motor, and the field is so arranged that the rotor is normally not self-starting. The input energy to be measured is connected to the leads 22, and this energy is synchronous and in phase with the field current of the motor. The input energy at conductors 22 is used to shift the phase of a part of the motor field in order to start the motor. I further provide means, here exemplified as a potentiometer 24 energized from the aforesaid leads 20, to supply energy for neutralizing the input or test energy coming to the meter over conductors 22, that is, the potentiometer is so connected as to be in phase opposition. The neutralizing potential is itself varied by a movable contact arm 26 which is connected to and moved by rotor 14. The potentiometer varies the neutralizing energy in such a direction as to tend to neutralize the input energy in response to rotation of the rotor. When the input energy is exactly neutralized, the motor comes to rest and the position of the motor, and consequently of the pointer 16, is commensurate with the value of the input energy being measured.

Figure 2:
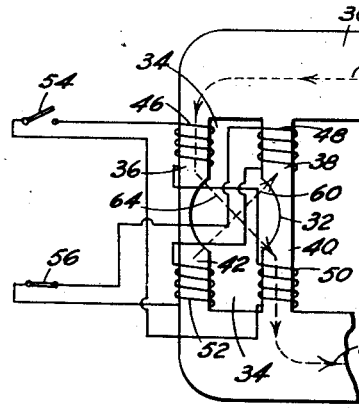
Fig. 2 is explanatory of the shading coil arrangement of the induction motor of Fig. 1.

Before describing the circuit of Fig. 1 in greater detail, it may be helpful to first consider Fig. 2, which shows the arrangement of shading coils in the induction motor. The core 30 of the motor is preferably a continuous or closed core. One leg is partially cut away at 32 to receive the rotor. This leg is cut away on opposite sides of the rotor, as is indicated at 34, thus providing shading poles 36, 38, 40, and 42. These carry shading coils 46, 48, 50, and 52. Diagonally opposite coils 46 and 50 are connected in series with one another, and the circuit therethrough may be closed or made conductive by a suitable device here indicated as a switch 54. Coils 48 and 52 are similarly connected in series with one another and may be short-circuited or made conductive by switch 56. These switches are closed in the alternative, and in Fig. 2, the switch 54 is shown open, while the switch 56 is shown closed. The shading coils act as the secondaries of a transformer the primary of which is the main field coil 58 (Fig. 1) of the motor. Coils 48 and 52 being short-circuited, they generate a flux, indicated by the dotted arrow 60, which is in opposition to the main field flux 62. The latter, therefore, takes a diagonal path through poles 36 and 40, as is indicated by the dotted arrow 64.

The current induced in the short-circuited shading coils is out of phase with the magnetizing current in the main field coil 58, and the shading coil flux, indicated by the arrow 60, is out of phase with the main field flux 64, thus producing a rotating field which causes self-starting of the rotor.

At this time, the motor may be treated as though shading coils 48 and 52 are the only shading coils, for coils 46 and 50, being open-circuited, are ineffective and may be treated as non-existent. The reason for providing coils 46 and 50 together with the control switch 54 is to produce rotation of the motor in the opposite direction. In other words, with switch 56 closed, the motor will start in one direction, whereas with switch 54 closed, the motor will start in the opposite direction.

The short-circuiting of the shading coils need not be complete, that is, they may be partially short-circuited through resistors, and by making the resistors variable, the conductivity of the shading coils may be varied in an incremental manner. An electron emission tube or vacuum tube may be used to serve as a variable resistance for this purpose, this being done by connecting the cathode to anode circuit of the tube across the shading coil and using the control electrode or grid of the tube to control the impedance of the tube, and consequently the flow of current through the tube, and therefore through the shading coils. The tube is thus made a control device for controlling the conductivity of the shading coil.

Reverting now to Fig. 1, the field core 30 has been drawn in a simplified or schematic fashion, and each of the series connected pairs of diagonally opposite shading coils is more conveniently represented by the single shading coils 46 and 52. The conductive devices 54 and 56 are the elements of a vacuum tube or electron emission tube 66 which, in the present case, is a double element tube of the type known commercially as 6N7. The tube 66 functions as two tubes, one for each set of shading coils, and it may be convenient hereinafter, for purposes of explanation, to refer to the same as two tubes rather than one.

Inasmuch as the tubes present a high resistance to flow of current, the effective resistance is preferably reduced by connecting the tubes to the shading coils through high ratio transformers 68 and 70. The resistance of the tube when reflected from the secondary to the primary of the transformer appears to the shading coil as the resistance of the tube divided by the square of the turns ratio of the transformer. Thus, a tube whose resistance is 10,000 ohms, if reflected through a 50 to 1 ratio transformer, will appear to the shading coil to have a resistance of only 4 ohms. The use of the transformers, therefore, makes the shading coils far more conductive and far more effective.

It will be observed that the anodes or plates 72 and 74 of the tubes are connected to the transformers in phase opposition, so that plate 72 is made positive (by the alternating energy from motor field coil 58) at the same time that plate 74 is made negative, and vice versa. Thus, one tube is conductive while the other is non-conductive, due to the influence of plate potential alone. The control electrodes 76 and 78 of the tubes are, however, connected together or in parallel. It has already been pointed out that the input energy or potential to be measured is synchronous with and preferably derived from the same power line as is used to energize the motor. When the grids 76 and 78 become more negative, they prevent current flow through the tubes, and when they become more positive, they permit current flow provided, however, that the anodes are positive. On reflection, it will be understood that only one tube or the other can be conductive at any one time, for in the other tube, when the anode is positive, the grid is more negative and obliterates the effect of the positive plate potential, and when the grid is more positive, the anode is negative, and in neither case will current flow. It should be understood that the tubes are so biased that the grids are at all times negative and can draw no grid current. The grids thus serve merely to control the tube resistance, and that control takes place only when the tube is conductive or only when the plate is positive.

The other tube, however, will have its grid and plate made more positive or more negative together, so that the tube is conductive for half cycles or functions as a half-wave rectifier. Although the shorting of the shading coil is intermittent, it is adequate and produces self-starting rotation of the motor in a direction dependent upon which of the two tubes is conductive.

For simplicity, I have described the operation as though the tubes are strictly non-conductive when the input or test potential is zero. Actually, the bias may be such that the tubes are somewhat conductive, thus permitting some flow of shading coil current, but this flow is equal in both coils and is of no effect. The bias of tubes 66 is obtained by means of a grid biasing resistor 80 and a grid condenser or blocking condenser 82 with associated grid leak resistor 84.

I may point out that while the anodes of the rectifiers have been connected in series or push-pull while the control electrode influence is applied in parallel, it is possible to obtain the same character of operation by connecting the rectifier anodes in parallel and a pair of control electrodes or control tubes in series or push-pull. Thus, referring to Fig. 1a, the anodes 72' and 74' are phased alike, and the control electrodes 76' and 78' are connected to opposite ends of a transformer secondary the mid-point of which is connected through a suitable biasing resistor 80' to the cathodes. The input transformer marked 90' has the neutralizing energy connected in series with the primary of the transformer, or the neutralizing energy may be applied still more remotely if an amplifying tube is used ahead of the transformer 90'. The transformers 68' and 70' correspond to the transformers 68 and 70 of Fig. 1 and are connected to the shading coils of the induction motor. The input energy is applied in push-pull. The significant thing about the relation of the tube elements is that electrodes of one type controlling the conductivity of the tubes are energized in alternation or push-pull, while electrodes of another type, also controlling the conductivity of the tubes, are energized in parallel or simultaneously.

The circuit of Fig. 1 further includes an amplifier tube 86 which in this particular case is illustrated as a tetrode of the type known commercially as 6J7. The input or test potential is applied to the control electrode or grid 88 of the tube through a transformer 90. The polarizing potential for tube 86 is obtained without the use of a special direct current source or special rectifier equipment by taking advantage of the rectification which takes place in tube 66. For this purpose, a voltage developing resistor 92 is connected in series between grid bias resistor 80 and ground, so that rectified energy (originating from line 20 and field coil 58 and absorbed from the shading coil) flowing through tube 66 flows through resistor 92. The plate resistance or load impedance 94 is connected to one end of resistor 92 while the cathode 96 is connected to the opposite end of resistor 92. The fourth electrode or screen grid 98 may be connected to a suitable intermediate point on resistor 92, thus tapping a desired intermediate potential from the resistor for grid 98. Resistor 92 is preferably shunted by a condenser 100 in order to by-pass the alternating or ripple components of the rectified energy. In this way, amplifier tube 86 may be used to obtain a high gain, say 100 to 1, without necessitating a special source of D. C. potential.

The potentiometer resistor 24 is preferably connected to line 20 through a step-down transformer indicated at 102. The potential tapped from the potentiometer decreases when the reading of pointer 16 decreases, and vice versa. It will be observed, from inspection of the diagram, that the secondary of transformer 90 for the input potential, and the potentiometer 24, are connected directly in series, and the transformer connections are such that these potentials are in phase opposition. Whenever the neutralizing potential from potentiometer 24 equals the input potential at the secondary of transformer 90, there is no alternating potential applied to the control tube 66 and the shade coils are equally loaded. Hence, there is no rotating field or starting torque.

As a matter of fact, the motor design is such that under these circumstances the rotor comes instantly to rest. It does not continue to run as a single phase motor. It stops for two reasons either of which would probably be adequate alone and both of which function together to brake the motor for instant stoppage.

Referring to Fig. 2, it will be observed that there is a continuous iron or core path at opposite sides of the rotor, and the field flux therefore is diverted around the rotor instead of crossing the rotor. With no flux crossing the rotor, no torque is developed. The second reason the rotor is brought to rest is that the shading coils are partially conductive and produce a reactive flux on the rotating rotor, thus braking the same and bringing it instantly to rest. Moreover, this braking action is aided by the frictional resistance of the parts of the motor and stylus and potentiometer contact arm.

To review the operation of Fig. 1, it may be explained that the tubes 66 serve as intermittent shorts, acting in sequence. When one plate is positive in respect to its cathode, the other is negative. Consequently, only one tube conducts at a time, and the plate current from both tubes flows through the bias resistor 80 and voltage developing resistor 92. The bias resistor places a small negative potential on both grids, and this appears across the grid leak 84. When there is a change in the value of the input potential being measured, an effective input potential (due to the difference between the input potential and the neutralizing potential at its previous adjustment) appears on the grid of amplifier tube 86 and is applied in amplified form on the grids of tubes 66, thus making the grids alternately more and less negative. During the negative half of the cycle, its potential adds to the bias potential to make the grids more negative, and during the positive half of the cycle its potential is subtracted to make the grid less negative. The tubes 66 thus become larger and smaller resistors. For example, if plate 72 is positive when grid 76 is most negative, the upper tube elements will present a very high resistance load to the flow of current from shading coil 46. During the next half cycle, the plate 72 becomes negative and the upper portion of the tube non-conductive. During this half cycle, however, the plate 74 becomes positive and the lower half of the tube is conductive. At the same time, the grids are least negative and the lower half of the tube acts as a comparatively low resistance load across shading coil 52. This unbalance of the load across the two shading coils causes the motor to rotate and its torque depends on the magnitude of the input potential difference. Its direction of rotation depends on the polarity of the effective input potential difference applied to the amplifier tube 86, and this in turn depends upon whether the potentiometer potential is greater than the input potential, or vice versa. Thus, if the input potential increases over the previous adjustment of the potentiometer potential, the polarity is that of the input potential, whereas if the input potential decreases, it is less than that of the potentiometer potential and the polarity is that of the potentiometer, which, of course, is opposite in phase to that of the input potential. The motor is thus driven in one direction or the other until the potentiometer potential neutralizes the newly changed input potential. Differently expressed, the indicator 16 or the motor constantly follows any change in the input potential, and the motor may be thought of and may be used as a follow-up motor.

Since the motor stops only when the tubes and shading coils are balanced, and inasmuch as a change in motor field potential does not affect this balance, the operation of the circuit is independent of line voltage within wide limits.

Figure 3:
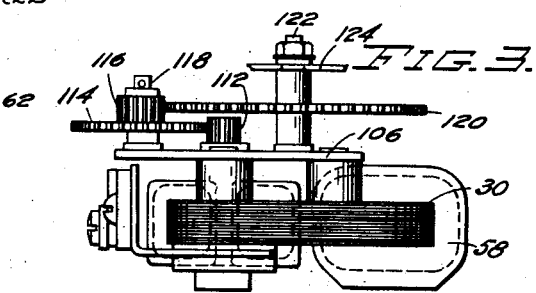
Fig. 3 is a plan view of one structural form of motor which may be used with my invention.
Figure 4:
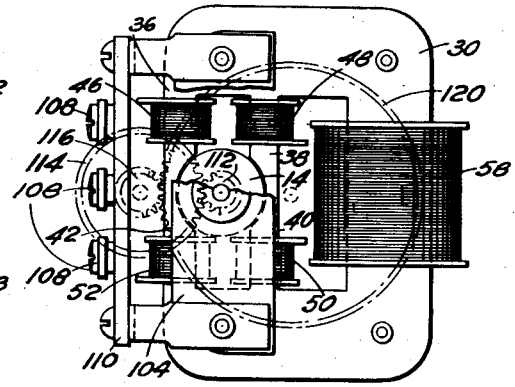
Fig. 4 is a rear elevation thereof.

A structural form of induction motor suitable for use in practicing my invention is illustrated in Figs. 3 and 4, referring to which the field core 30 has field coil 58 wound about one leg, while the rotor 14 is received in an opening cut through the opposite leg. This leg is divided to form the four poles 36, 38, 40, and 42 previously referred to, around which are placed the shading coils 46, 48, 50, and 52.

As a refinement, the rotor 14 may be made of a non-magnetic material so that there will be no operating torque as a single phase motor, the flux being shunted on opposite sides of the rotor through the continuous core. This refinement is not necessary for successful operation. The rotor shaft is carried in bearings which are preferably formed in non-magnetic plates, such as the brass plate 104 on one side, and the brass plate 106 on the opposite side. Connections to the shading coils may be made at the screws 108 mounted on insulation strip 110. There are only three connection screws because the adjacent sides of the shading coils may be connected in common.

The present motor is provided with a high ratio reduction gear train, thus adding greatly to the torque applied to the recording stylus and potentiometer contact arm. The ability to use reduction gearing is one of the advantages of the present meter. Specifically, the rotor shaft carries a pinion 112 meshing with a gear 114 secured to a pinion 116 and rotating freely about a fixed pin 118 projecting outwardly from plate 106. Pinion 116 meshes with a large diameter gear 120 rotating on a pin 122 secured to plate 106. The indicator hand, or recorder stylus or the like, a fragment of which is indicated at 124, is secured to and rotates with gear 120.

Figure 5:
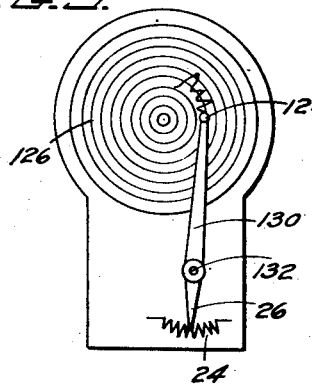
Fig. 5 is a schematic representation showing the invention applied to a recorder of the disk type.

It has already been mentioned that the substantial torque obtained with the present device makes it particularly useful for operation of a recorder, and referring to Fig. 5, I there show a recorder which is conventional in having a disk record 126 rotatably mounted on a suitable turntable which is slowly turned by appropriate clockwork mechanism. In many cases, the disk is turned once for each day, but any desired interval may be used. A record is traced on the disk by means of a stylus or pen 128 carried at the upper end of a recording arm 130 which is secured at 132 to the induction motor previously described. It may, for example, be secured to the gear 120 referred to in Figs. 3 and 4. The potentiometer is indicated at 24 and is varied by contact arm 26, all as has already been described.

The continuous rotation of the rotor may be used to produce a rectilinear motion, as by means of a lead screw, and such an arrangement is schematically illustrated in Fig. 6. The motor generally designated 134 has its rotor shaft 136 connected to lead screw 138. A nut 140 rides on screw 138 and carries a stylus or pen 142. This traces a record 144 on a sheet or strip of paper 146 which is slowly unwound from a suitable supply drum and wound onto a suitable take-up drum. The paper 146 is directed about a lower roll 148, and an upper roll 150, and is preferably moved at uniform speed by appropriate clockwork. Nut 140 also varies potentiometer 152 by means of contact arm 154. It will be understood that, in this arrangement, advantage is taken of the continuous rotation of the motor, and the essential difference is merely that the motion reducing means or gear reduction mechanism is in the form of a screw rather than in the form of spur gearing.

The present mechanism is of advantage even when dealing with an indicator rather than a recorder, first because a rugged, sturdy instrument is obtained; second, because a large, easily visible hand or pionter may be used in combination with a large scale; and third, because the benefit of a large scale may be obtained while using a small diameter instrument. It should be kept in mind that ordinary indicating instruments, using an oscillatable coil rather than a continuously rotatable motor, have a scale which is limited in arc and ordinarily does not exceed, say, 60°. The present motor may be used with a scale having an arc of nearly 360°. This is schematically illustrated in Fig. 7, in which the scale 160 of the instrument extends through almost 360°, it being used in cooperation with a pointer 162 secured to shaft 164 which may be either the rotor shaft or a shaft geared to the rotor shaft through appropriate reduction gearing, all as was previously explained. The potentiometer resistance 166 extends over an equal arc and is operated upon by contact arm 168.

The control circuit for the shading coils of the induction motor described in connection with Figs. 3 and 4 may be modified from that shown in Fig. 1, and a different illustrative circuit is shown in Fig. 8, which is next described. Referring to that figure, the induction motor is like that previously described and comprises core 30 magnetized by field winding 58, energized from A. C. line 20. Rotor 14 moves indicator 16 and potentiometer contact arm 26, thus varying the effective potential of potentiometer resistor 24. The shading coils 46 and 52 are connected to transformers 170 and 172 having a common grounded return 174. At this point, it may be mentioned that a similar common grounded return may be used for the transformers 68 and 70 in Fig. 1.

The control arrangement of Fig. 8 differs from Fig. 1 in that the rectification and control functions of tube 66 in Fig. 1 have been separated from one another, and the amplifier tube 86 has been omitted, this obviously being a mere refinement which may be used or omitted, depending upon the magnitude of the input energy to be measured. The rectifier tubes are indicated at 176 and 178, while the control function is obtained in a separate tube 180.

Transformers 170 and 172 are connected to oppositely polarized diode rectifier tubes 176 and 178. The cathodes of the rectifiers are connected together and to the anode 182 of control tube 180, this tube being an ordinary triode. The input or test energy coming over line 184 is applied to the grid 186 of the control tube through a suitable impedance matching transformer 188. The secondary of this transformer is connected in series with potentiometer 24 by means of a lead 190, the potentials being opposed for neutralization, as previously explained. Control tube 180 is biased by means of resistor 192 shunted by condenser 194.

The operation of this arrangement will be clear if it is kept in mind that in Fig. 1 the control electrodes of tube 66 are varied together or in phase, whereas the anodes are connected in series or in opposite phase. Similarly, in Fig. 8, the rectifiers 176 and 178 have the anodes made positive in alternation, while the main path through both rectifiers in parallel is made more or less conductive under the influence of control grid 186 in tube 180. One rectifier will remain non-conductive, its anode being negative when tube 180 is conductive, and tube 180 being non-conductive when the rectifier anode is positive. The other rectifier will be conductive for half cycles, its anode being positive when tube 180 is conductive and its anode being negative when tube 180 is non-conductive. The shading coils associated with the conductive rectifier are effective to provide a starting torque in proper direction to help neutralize the input energy. It may be said that the shading coils are shunted by the resultant of the input and neutralizing energies, and the direction of rotation of the rotor is such as to tend to bring the resultant to zero.

The advantage of using separate rectifiers, as shown in Fig. 8, is that the rectifier tubes are of low impedance, being a matter of only 200 ohms compared to, say, 20,000 ohms. Any error due to structural difference in the electrodes of the two rectifier tubes is negligible. The arrangement of Fig. 8 may, therefore, in some cases, be more accurate than the arrangement of Fig. 1, which theoretically requires the use of electrodes which are structurally alike. On the other hand, the arrangement of Fig. 1 is more convenient and inexpensive for ordinary commercial purposes, and in my experience there has been no variation in the electrode structure sufficient to be significant in ordinary practice.

Fig. 8 illustrates an important feature which is wholly independent of the particular type of control tubes used, this feature being the feed coil 200 which greatly increases the torque of the motor. Feed coil 200 may be used with the circuit of Fig. 1, it simply being connected in a common return to the two sets of shading coils. Coil 200 is coupled to the main power line 20 through transformer 202. Feed coil 200 greatly increases the current flow through the shading coils and thereby multiplies the torque of the motor. It should be kept in mind that the shading coil circuits are absorption circuits. The shading coils are made conductive by the tubes, but the energy flowing through the shading coils is energy induced from the main field coil and absorbed therefrom by the shading coil circuit. With the additional feed coil 200, the amount of energy available to be absorbed or to flow through the shading coils is increased enormously, thereby increasing the current flow through the shading coils and the torque of the motor. While the extra current flow is equal in both sets of shading coils when there is no change in input energy, when a change occurs one shading coil is shunted by a greatly reduced resistance and the other by a greatly increased resistance, and this greatly increases the difference in current flow between the effective and ineffective shading coils. Thus, the field component causing self-starting torque in the motor is increased. As an extreme example, if one coil is made conductive while the other is open-circuited, obviously, all of the extra current supplied by the feed coil 200 contributes to multiply the motor torque, the feed coil having no influence whatsoever on the open shading coil.

It may be mentioned in passing that in both Figs. 1 and 8 the diagrams have been simplified by omitting the cathode heating filaments and supply circuits therefor.

It is not essential to use an induction motor of the type heretofore described, and in Fig. 9 I show how the invention may be applied to a different form of induction motor. Referring to that figure, the rotor 204 rotates within a field core comprising an inner ring 206, an outer ring 208, and four radial legs or poles 210. These are provided with field windings 212, 214, 216, and 218. The field windings are all connected in series and to an alternating current line 220. It will be seen that the diametrically opposed coils 212 and 216 are connected in series with one another by conductor 222; that the diametrically opposed coils 214 and 218 are connected in series with one another by conductor 224; and that these two sets of coils are connected in series by conductor 226. The free ends of coils 214 and 216 are connected to the line 220.

Each pair of coils is arranged to be shunted by a variable resistance, or, more specifically, by electron tube rectifier elements, just as was described in connection with Figs. 1 and 8. Thus, the coils 212 and 216 are provided with leads 228 and 230 which extend to the vacuum tube elements, preferably through a high ratio transformer, just as was previously described. Similarly, the coils 214 and 218 are provided with connections 232 and 234 which extend to the other rectifier arranged in opposite phase. It will be understood that to complete the circuit of Fig. 9, a potentiometer for neutralizing energy may be employed and connected in opposition to the input energy, all as was previously described. As before, one or the other sets of shunting connections is made conductive. This adds a resistance in parallel to one set of coils, while the other set of coils remains relatively a pure inductance. There is a consequent shift in phase of one set of coils relative to the other, and inasmuch as the poles are rotatably displaced, this difference in phase is all that is needed to produce a rotating field, thus establishing the conditions for self-starting induction motor operation. The direction of rotation depends upon which of the two sets of coils is shunted by the effective resistance.

It will thus be seen that the broad principles of the invention may be applied to the main coils of an induction motor field as well as to auxiliary shading coils. The essential idea is to produce a rotating field from a single phase source by shifting the phase of energy producing a part of the field, this shift in phase being obtainable in either direction in order to produce rotation in either direction, all in response to changes in magnitude of input energy being measured.

The meter or follow-up motor heretofore described may be applied to a wide variety of uses. A few typical applications of the invention are next described, but this is merely for purposes of illustration and is not in limitation of the invention.

The invention may be used to measure micrometric changes in distance by combining it with a magnetic micrometer of any known form, or, more particularly, of the form illustrated and described in my copending application, Serial Number 215,302, filed concurrently herewith. Referring to Fig. 10, the magnetic micrometer comprises a core 240 having a main field winding 242 which is connected to an alternating current line, ordinarily the same line that energizes the motor. An armature 244 is pivoted between the spaced poles of field core 240, and the motion to be measured is applied to the end of armature 144. A pick-up coil 246 surrounds armature 244. With the armature in mid-position, the field flux flows transversely across the armature and there is no potential across pick-up coil 246. However, upon tilting of armature 244, a part of the field flux is by-passed longitudinally through the armature, thus inducing a potential in the pick-up coil.

The flux flows along armature 244 in one direction or the other, depending upon whether the armature has been tilted upwardly or downwardly, and this determines the phase of the potential across coil 246. The magnitude of the potential depends upon the amount of movement, and the variation is linear because the drop in field intensity or flux gradient across the poles of the field core is linear. The potential is thus a function of the movement of the armature and may be used to measure micrometric movements. For example, the stress exerted on ingots being rolled in a rolling mill may be determined by strain of the frame of the rolling mill, which in turn may be measured by a magnetic micrometer, all as is described in greater detail in my copending application aforesaid. The output of pick-up coil 246 is applied to a transformer 248, and this corresponds to the input transformer 90 of Fig. 1, or the input transformer 188 of Fig. 8. The motor is then used to operate a recording pen and thereby trace a written record of the rolling mill stress as the successive pieces of work are run through the mill.

Referring now to Fig. 11, I illustrate one method by which the invention may be applied for temperature measurement. Any conventional form of pyrometer or bolometer may be used, this being indicated at 250. Essentially, it is a resistance which varies with temperature. It acts as one arm of a bridge circuit, the other arms of which are made up of fixed resistors 252, 254, 256, and a variable or potentiometer resistor 258, part of which lies in each of the two lower arms of the bridge. Resistors 256, 258, and 254 may be considered to be one continuous potentiometer resistor, but it is convenient to build it up out of two fixed and one variable resistor, as shown, because the variations being dealt with are very small. This potentiometer resistor corresponds to the potentiometers described in connection with Figs. 1 and 8 in the sense that it is a corrective device operated by the motor rotor, though the exact method of connection in circuit is somewhat different from that heretofore described.

The bridge is energized by an alternating current supplied thereto from the main line 260 through leads 262 and transformer 264. Any unbalance of the bridge causes a flow of current through the primary of transformer 266, the output of which is applied to the grid of an amplifier tube 268. The transformer 266 and tube 268 correspond to transformer 90 and tube 86 in Fig 1.

The amplified output of tube 268 is applied to a single triode or control tube 270, which in turn is connected in parallel with diode rectifiers 272 and 274. These are coupled through transformers 276 and 278 to the shading coils 280 and 282 of induction motor 284. The main field coil 286 of the induction motor is energized from power line 260.

It will be recognized that the electron tube arrangement of Fig. 11 is a combination of the arrangements shown in Figs. 1 and 8, it being like Fig. 1 in that it uses an amplifier tube 268 which is polarized by means of a potential obtained from the shading coils and rectifier tubes, and it is like Fig. 8 in that the rectifier tubes are diodes separated from the control tube 270. More specifically, tubes 268 and 270 are connected by resistance coupling including a plate resistor 288 for the output of tube 268, a blocking condenser 290, and a grid leak resistor 292. Tube 270 is biased by means of biasing resistor 294. The polarizing potential for amplifier tube 268 is developed across a voltage developing resistor 296 which is bypassed by filter condenser 298. Tube 268 is biased by means of biasing resistor 300.

The temperature is indicated or recorded by means of stylus 302 moved by motor rotor 304. The rotor also moves a contact arm 306 which varies potentiometer resistor 258 previously referred to. For convenience, these parts have been shown twice, once at the motor 284 to illustrate the physical construction, and again at the resistance bridge to illustrate the electrical operation.

It will be evident that any change in temperature produces a change in the resistance of the pyrometer or bolometer unit 250. This unbalances the bridge and causes a flow of input energy in one direction or the other. This in turn makes one or the other shading coil conductive, thus starting the motor. The movement of the motor varies potentiometer resistor 258 in that direction which brings the bridge to balance, and when the bridge is balanced the input energy is reduced to zero, or, in a broad sense, is neutralized. The movement of the motor needed to balance the bridge is, of course, a measure of the temperature.

The invention may be used to record voltage, as, for example, the voltage of the A. C. power line. For this purpose, a circuit exactly like that shown in Fig. 11 may be used, except that a low power incandescent lamp may be substituted for the pyrometer. This is indicated in Fig. 12, which shows the bridge portion of Fig. 11 but with a lamp 310 substituted for the pyrometer 250. The resistance of the lamp changes as the line voltage varies, this being due to temperature variation, depending on the heating of the filament. The recording motor may be said to record the changes in resistance of the lamp, but actually the scale may show the line voltage directly, just as in the case of Fig. 11 the scale may show the temperature directly.

The resistors of the bridge may, if desired, be made of a metal having little or no temperature coefficient of resistivity, such as the resistors known commercially as Manganin or Constantin.

It is believed that the construction, operation, and method of using my improved meter or follow-up motor, as well as the many advantages thereof, will be apparent from the foregoing detailed description. The follow-up motor is much better than a system using two contacts and three wires for controlling a reversing motor, not only because the present induction motor is simple and inexpensive, but also because there is no hunting such as occurs when using contacts. The motor operates at high speed, its speed being substantially the synchronous speed of the motor. Adequate torque is available. The motor comes to rest without hunting because when it reaches nearly the correct position, the motion becomes incremental and approaches a definite limit, there being a loss of torque, and then zero torque when the balanced position is reached. Contacts which are necessary with a double contact three-wire system are troublesome because they are difficult to keep clean.

The available torque is adequate for direct recording, and this is an important feature, as will be recognized if prior systems are kept in mind, such systems necessitating a freely moving needle with an intermittent power-operated depressor for causing transverse printing movement. Many prior systems utilizing a bridge arrangement require intermittent adjustment of the bridge at periodic intervals, whereas in my improved system there is a continuous adjustment at all times.

The motor arrangement is such that continuous rotation may be used, and it is, therefore, possible to employ a lead screw for rectilinear movement or reduction gearing, and it is also possible to use an indicator hand with a scale of nearly 360°. The motor is used with ordinary alternating current obtainable directly from a common power or lighting line, and the readings obtained are independent of variations in power line voltage. In Figs. 11 and 12, the arrangement is a bridge arrangment and therefore is independent of the power line voltage, while in the arrangements of Figs. 1, 8, and 10, it should be kept in mind that any variation of power line voltage causing a variation in neutralizing potential is accompanied by an equal variation in the input potential, because the input potential is itself obtained from the same power line.

It will be apparent that while I have shown and described my invention in several preferred forms, many changes and modifications may be made in the structures disclosed without departing from the spirit of the invention defined in the following claims. In some claims, the term "field coils" is intended to include shading coils; the expression "neutralize the input energy" is intended to include not only direct neutralization as in Figs. 1 and 8, but also indirect neutralization as in Figs. 11 and 12; the term "control element" for the rectifiers is intended to include an element within the rectifier tubes or within a twin tube, as in Fig. 1, as well as in a separate tube, as in Figs. 8 and 11.

I claim:

1. A measuring device comprising an induction motor having at least two field coils, a main source of alternating current for the motor field, separate absorption circuits which are isolated to function independently of one another, said circuits being connected to said coils for increasing the effectiveness of one or the other, a source of synchronously alternating input energy to be measured which energy is synchronous with the motor field current, electron relay means responsive to said input energy and located in said absorption circuits to act as variable impedances for shifting the phase of a part of the motor field in order to start the motor, and means controlled by consequent rotation of the motor to progressively reduce the effect of the input energy as the motor rotates, whereby the motor is brought to rest at a position commensurate with the value of the input energy being measured.

2. A measuring device as defined in claim 1, in which the induction motor includes four poles, four coils on said poles, and two electron relay circuit controlling devices, opposite coils being connected in series and to one of the electron relay circuit controlling devices, said circuit controlling devices being responsive to changes in the value of the input energy in order to shunt and thereby shift the phase of one or the other opposite sets of coils so as to cause self-starting rotation of the rotor.

3. A measuring device as defined in claim 1, in which the induction motor has a closed field core with a field winding about one leg and an opening through another leg for the rotor, said latter leg being cut away on each side of the rotor to form four shading poles, shading coils on said shading poles, diagonally opposite coils being connected in series and to one of the electron relay circuit controlling devices, said circuit controlling devices being responsive to changes in the value of the input energy in order to make one or the other set of shading coils conductive, so as to cause self-starting rotation of the rotor in proper direction.

4. A measuring device as defined in claim 1, in which there are two field coils connected to oppositely poled rectifiers, whereby said rectifiers tend to be conductive in alternation, an electron tube control element so arranged in respect to said rectifiers as to tend to make them simultaneously conductive or non-conductive, and means for applying the alternating input energy to be measured to the control element, whereby only one or the other rectifier becomes conductive, depending on the phase of the alternating input energy.

5. A measuring device as defined in claim 1, and further comprising a meter which is connected to and moved by the rotor.

6. A measuring device comprising a single phase induction motor having field poles and coils so arranged that the motor is normally not self-starting, and is self-stopping, a main source of alternating current for the motor field, a source of input energy to be measured, said energy being synchronous with the motor field current, adjustable means to neutralize the input energy, a first absorption circuit connected to one of the field coils and a second absorption circuit connected to another of the field coils, said absorption circuits being isolated to function independently of one another, means responsive to any unneutralized input energy for making one absorption circuit or the other effective and thereby shifting the phase of a part of the motor field in order to start the motor, and means controlled by the motor to shift the neutralizing means in such a direction as to tend to bring the input energy to zero, whereby the motor comes to rest at a position commensurate with the value of the input energy being measured.

7. A measuring device as defined in claim 6, in which the induction motor has a closed field core with a field winding about one leg and an opening through another leg for the rotor, said latter leg being cut away on each side of the rotor to form four shading poles, shading coils on said shading poles, diagonally opposite coils being connected in series and to a circuit controlling device, said circuit controlling device being responsive to changes in the value of the input energy in order to make one or the other diagonally opposite pairs of shading coils conductive, so as to cause self-starting rotation of the rotor in proper direction.

8. A measuring device as defined in claim 6, in which the input energy is alternating and synchronous with the field energy and in which there are two sets of field coils connected to high ratio transformers, oppositely poled electron tube rectifier elements connected to the transformers whereby said rectifiers tend to be conductive in alternation, an electron tube control element so arranged in respect to said rectifier elements as to tend to make them simultaneously conductive or non-conductive, and means for applying the alternating input energy to be measured to the control element, whereby only one or the other rectifier is made conductive, depending on the phase of the alternating input energy.

9. A measuring device as defined in claim 6, in which the input energy is alternating and synchronous with the field energy and in which there are two differently positioned shading coils connected to the anodes of oppositely poled electron tubes, whereby the tubes tend to be conductive in alternation, control electrodes in said electron tubes connected in parallel so as to tend to make the tubes simultaneously more or less conductive, and means for applying the alternating input energy to be measured to the control electrodes of the tubes.

10. A measuring device as defined in claim 6, in which the neutralizing means comprises a transformer connected across the main alternating current source, a potentiometer resistance having its ends connected across the secondary of the transformer and having the variable portion thereof connected to be effectively in series opposition with the input energy.

11. A measuring device as defined in claim 6, and further comprising reduction gearing, and a meter which is moved by the rotor through the reduction gearing.

12. A measuring device comprising a single phase induction motor having shading poles and coils so arranged as to start the motor in either direction, a main source of alternating current for the motor field, a source of input energy to be measured, said energy being synchronous with the motor field current, absorption devices connected across said shading coils and responsive to said input energy to make one or the other of said devices conductive, in order to start the motor, said absorption devices being isolated to function independently of one another, a feed coil between said devices and shading coils, means to supply alternating current from the aforesaid main source to the feed coil in order to increase the motor torque, and means controlled by the motor to reduce the effect of the input energy as the motor rotates, whereby the motor is brought to rest at a position commensurate with the value of the input energy being measured.

13. A measuring device comprising a single phase induction motor having shading poles and coils so arranged as to start the motor in either direction, a main source of alternating current for the motor field, a source of input energy to be measured, said energy being synchronous with the motor field current, adjustable means to neutralize the input energy, oppositely poled rectifiers connected across said shading coils, whereby said rectifiers tend to be conductive in alternation, said rectifiers acting as absorption devices and being separately connected to the shading coils so as to operate independently of one another, a common lead between said rectifiers and shading coils including a feed coil, means responsive to said input energy for controlling the conductivity of said absorption rectifiers in unison, whereby one or the other of said shading coils is made conductive in order to shift the phase of a part of the motor field to start the motor, means to supply alternating current from the aforesaid main source to the feed coil in order to increase the motor torque, and means controlled by the motor to shift the neutralizing means in such a direction as to tend to bring the input energy to zero, whereby the motor is brought to rest at a position commensurate with the value of the input energy being measured.

14. A measuring device comprising an induction motor including two field coils, a main source of alternating current for the motor field, oppositely poled rectifier elements connected to the field coils whereby said rectifiers tend to be conductive in alternation, said rectifiers acting as absorption devices and being separately connected to the field coils so as to operate independently of one another, an electron tube control element so arranged in respect to said rectifier elements as to tend to make them simultaneously conductive or non-conductive, a source of synchronous alternating input energy to be measured, said energy being synchronous with the motor field current, adjustable means to neutralize the input energy, an amplifier tube for amplifying any unneutralized input energy, means to supply the output of the amplifier tube to the aforesaid control element, means controlled by the motor to vary the neutralizing means in such a direction as to tend to bring the input energy to zero, and means for supplying direct anode potential for said amplifier tube, said means including a voltage developing resistor connected in series with the rectifier tubes, the anode and cathode of said amplifier tube being connected across the voltage developing resistor.

15. A measuring device comprising an induction motor having field coils connected to separate absorption circuits which are isolated to function or absorb energy independently of one another and which include rectifier elements acting as variable impedances for the absorption circuits, an electron tube control element so arranged in respect to said rectifier elements as to make one conductive and the other non-conductive, a main source of alternating current for the motor field, a source of alternating input energy to be measured, said energy being synchronous with the motor field current, adjustable means moved by the motor to neutralize the input energy, means for supplying any unneutralized energy to the control element in order to shunt one or another coil so as to start the motor, said adjustable means being moved by the motor in proper direction to tend to bring the input energy to zero.

16. A measuring device comprising an induction motor having a closed field core with a field winding about one leg and an opening through another leg for the rotor, said latter leg being cut away on each side of the rotor to form four shading poles, shading coils on said shading poles, diagonally opposite coils being connected in series and to rectifier elements, said rectifiers acting as absorption devices and being separately connected to the shading coils so as to operate independently of one another, an electron tube control element so arranged in respect to said rectifier elements as to make one of them conductive and the other non-conductive, a main source of alternating current for the motor field, a source of synchronous alternating input energy to be measured, said energy being synchronous with the motor field current, adjustable means moved by the motor to neutralize the input energy, means for supplying any unneutralized energy to the control element in order to make one or another set of shading coils conductive so as to start the motor, said adjustable means being moved by the motor in proper direction to tend to bring the input energy to zero, whereby the motor is brought to rest at a position commensurate with the value of the input energy being measured.

17. A measuring device comprising an induction motor having field coils connected to separate absorption circuits which are isolated to function or absorb energy independently of one another and which include oppositely poled rectifier elements, whereby said rectifiers tend to be conductive in alternation, an electron tube control element so arranged in respect to said rectifier elements as to tend to make them simultaneously conductive or non-conductive, a main source of alternating current for the motor field, a source of alternating input energy to be measured, said energy being synchronous with the motor field current, means including a potentiometer resistance to supply alternating current from the aforesaid main source in phase opposition to the input energy in order to neutralize the input energy, means for supplying any resultant energy to the control element in order to shunt one or another coil so as to start the motor, and a contact arm moved by the motor to vary the neutralizing energy tapped from the potentiometer in proper direction to tend to bring the resultant of the input and neutralizing energies to zero.

18. A measuring device comprising an induction motor having a closed field core with a field winding about one leg and an opening through another leg for the rotor, said latter leg being cut away on each side of the rotor to form four shading poles, shading coils on said shading poles, diagonally opposite coils being connected in series and to oppositely poled electron tube rectifier elements, whereby said rectifiers tend to be conductive in alternation, said rectifiers acting as absorption devices and being separately connected to the shading coils so as to operate independently of one another, an electron tube control element so arranged in respect to said rectifier elements as to tend to make them simultaneously conductive or non-conductive, a main source of alternating current for the motor field, a source of synchronous alternating input energy to be measured, said energy being synchronous with the motor field current, means including a potentiometer resistance to supply alternating current from the aforesaid main source in phase opposition to the input energy in order to neutralize the input energy, means for supplying any resultant energy to the control element in order to make one or another set of shading coils conductive so as to start the motor, and a contact arm moved by the motor to vary the neutralizing energy tapped from the potentiometer in proper direction to tend to bring the resultant of the input and neutralizing energies to zero.

19. A measuring device comprising a bridge circuit with one leg variable in response to the measurement being made, a meter comprising an induction motor, a main source of alternating current for the motor field and the bridge, means responsive to unbalance of the bridge for shifting the phase of a part of the motor field in order to start the motor, and means controlled by consequent rotation of the motor to balance the bridge, whereby the bridge is continuously balanced by the motor and the meter indicates a value commensurate with the change in the quantity being measured.

20. A measuring device comprising a bridge circuit having a resistance in one leg which is varied in response to a quantity to be measured, a meter including an induction motor having field coils connected to electron tube rectifier and control elements, elements of one type being connected in push-pull and elements of another type being connected in parallel, said rectifiers acting as absorption devices and being separately connected to the field coils so as to operate independently of one another, a main source of alternating current for the motor field and for the bridge, means responsive to unbalance of the bridge for providing an input current to be applied to one type of element, thereby shunting one or another field coil of the motor in order to start the motor, and means varied by said motor in proper direction to tend to balance the bridge, whereby the motor comes to rest when the bridge is balanced and the meter indicates a value commensurate with the quantity being measured.

21. In combination, an induction motor having a field coil and shading coils for making the motor self-starting in either direction, oppositely poled rectifier tubes connected to the shading coils, whereby said rectifiers tend to become conductive in alternation, said rectifiers acting as absorption devices and being separately connected to the shading coils so as to operate independently of one another, an electron tube control element so arranged in respect to said rectifiers as to tend to make them simultaneously conductive or non-conductive, and means for applying input energy to the control element, said input energy being synchronous with the power supply to the motor field coil, whereby only one or the other rectifier becomes conductive depending on the phase of the alternating input energy.

22. In combination, an induction motor having a field coil and shading coils for making the motor self-starting in either direction, oppositely poled rectifiers connected to and energized by the shading coils, whereby said rectifiers tend to become conductive in alternation, said rectifiers acting as absorption devices and being separately connected to the shading coils so as to operate independently of one another, an amplifier tube having a control electrode and so connected to said rectifiers as to tend to make them simultaneously conductive or non-conductive, means for supplying direct anode potential for the amplifier tube, said means including a voltage developing resistor connected in series with said rectifiers, the anode and cathode of said amplifying tube being connected across said voltage developing resistor in order to polarize the amplifying tube, and means for applying input energy to the control element, said input energy being synchronous with the power supply to the motor field coil, whereby only one or the other rectifier becomes conductive depending on the phase of the alternating input energy.

23. In combination, an induction motor having a field coil and shading coils for self-starting operation in either direction, a two-element rectifier connected to one of said shading coils, another two-element rectifier connected to the other shading coil, said rectifiers acting as absorption devices and being separately connected to the shading coils so as to operate independently of one another, the anodes of said rectifiers being connected to said shading coils in phase opposition and the cathodes of said rectifiers being connected together and to the anode of an amplifier tube having a control electrode, a main source of alternating current for the motor field coil, and a source of synchronous alternating input energy connected to the control electrode of the amplifier tube in order to make one or the other rectifier conductive so as to start the motor in one direction or the other, depending on the phase of the input energy, said input energy being synchronous with the field current.

24. A measuring device comprising an induction motor having a field coil and shading coils for self-starting operation in either direction, a two-element rectifier connected to one of said shading coils, another two-element rectifier connected to the other shading coil, said rectifiers acting as absorption devices and being separately connected to the shading coils so as to operate independently of one another, the anodes of said rectifiers being connected to said shading coils in phase opposition and the cathodes of said rectifiers being connected together and to the anode of an amplifier tube having a control electrode, a main source of alternating current for the motor field coil, a source of synchronous alternating input energy to be measured, said energy being synchronous with the motor field current, adjustable means moved by the motor to neutralize the input energy, means for supplying any un-neutralized energy to the control electrode of the amplifier tube in order to make one or the other rectifier conductive so as to start the motor in one direction or the other, said adjustable means being moved by the motor in proper direction to tend to bring the input energy to zero, whereby the motor is brought to rest at a position commensurate with the value of the input energy being measured.

25. In combination, an induction motor having a field coil and shading coils for making the motor self-starting in either direction, a rectifier tube circuit connected to one of the shading coils, a rectifier tube circuit connected to the other shading coil, said rectifiers acting as absorption devices and being separately connected to the shading coils so as to operate independently of one another, means for controlling the circuits of said rectifier tubes, whereby either may be made operative to absorb energy from its associated shading coil, and means requiring direct current energy for its operation, said means being coupled to said rectifier tubes and energized by the direct current component of the energy absorbed by either of said rectifier tubes, whereby said tubes act as a source of direct current energy for said means.

SAMUEL J. A. M. BAGNO.